(12) United States Patent
Tsai

(10) Patent No.: US 6,457,328 B1
(45) Date of Patent: Oct. 1, 2002

(54) COLOR ORNAMENTAL CORD DEVICE

(76) Inventor: Cheng-Lang Tsai, No. 38, Lane 196, Kwangfu Rd., Sec. 2, San Chung City, Taipei Hsien (TW)

( * ) Notice: Subject to any disclaimer, the term of this patent is extended or adjusted under 35 U.S.C. 154(b) by 119 days.

(21) Appl. No.: 09/635,412

(22) Filed: Aug. 10, 2000

(30) Foreign Application Priority Data

Jun. 23, 2000 (TW) .......................................... 89210857

(51) Int. Cl.⁷ .................................................. A44C 5/00
(52) U.S. Cl. ........................... 63/3; 63/DIG. 3; 428/114; 428/99
(58) Field of Search ................................. 63/3, 5.1, 5.2, 63/11, DIG. 3; 428/99, 114

(56) References Cited

U.S. PATENT DOCUMENTS 5,413,822 A * 5/1995 Rey .................................. 63/3

* cited by examiner

*Primary Examiner*—Alexander S. Thomas
(74) *Attorney, Agent, or Firm*—Bacon & Thomas

(57) ABSTRACT

A color ornamental cord device having at least one piece of supporting core material, at least one reinforcing wire respectively embedded in each piece of supporting core material, a color ornamental material surrounding each piece of the at least one piece of supporting cord material, and a transparent plastic cover layer extrusion-molded on the color ornamental material.

6 Claims, 5 Drawing Sheets

US 6,457,328 B1

COLOR ORNAMENTAL CORD DEVICE

BACKGROUND OF THE INVENTION

The present invention relates to a color ornamental cord device adapted for making, for example, a bracelet, and more particularly to such a color ornamental cord device, which comprises a wire-reinforced supporting core material, a color ornamental material surrounding the supporting core material, and a transparent plastic cover layer holding the supporting core material and the color ornamental material.

In order to add colors to personal ornamental pieces such as bracelets, necklaces, angle bracelets, chains, etc., two or more materials of different colors may be used for making the desired personal ornamental pieces. FIG. 1 illustrates a bead bracelet 1 constructed according to the prior art. This structure of bead bracelet 1 comprises a string 10, a plurality of beads 11 fastened to the string 10, and a fastener 12 adapted to join the ends of the string 10. The fabrication of this structure of bead bracelet is complicated, and consumes much labor. When in use, the beads 11 tend to be covered with dust, and the string 10 tends to be broken. FIG. 2 shows another structure of bracelet according to the prior art. This structure of bracelet 2 comprises a transparent tube 20, a colored fluid sealed in the transparent tube 20, and a fastener 21 adapted to join the two distal ends of the transparent tube 20. The fabrication of this structure of bracelet is also complicated, and consumes much labor. When stretched, the fastener 21 tends to be disconnected from the ends of the transparent tube 20, causing the colored fluid to leak out of the transparent tube 20.

SUMMARY OF THE INVENTION

The invention has been accomplished under the circumstances in view. According to one aspect of the present invention, the color ornamental cord device comprises a supporting core material, a color ornamental material surrounding the supporting core material, and a transparent plastic cover layer holding the supporting core material and the color ornamental material. According to another aspect of the present invention, the color ornamental material can be a color tape wound round the supporting core material, or a meshed color tube sleeved onto the supporting core material. According to still another aspect of the present invention, the supporting core material is embedded with at least one reinforcing wire. According to still another aspect of the present invention, the supporting core material and the transparent cover layer have different cross sections so that a fantastic light diffusion effect is produced when putting the color ornamental cord device under the radiation of light.

DETAILED DESCRIPTION OF THE PREFERRED EMBODIMENT

Figure 1:
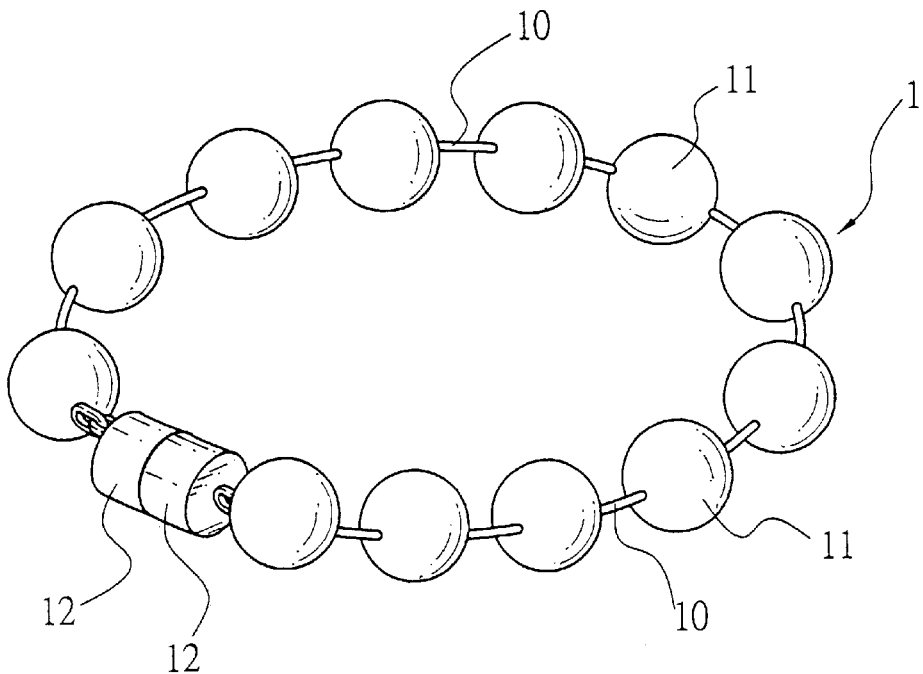
FIG. 1 illustrates a bead bracelet constructed according to the prior art.
Figure 2:
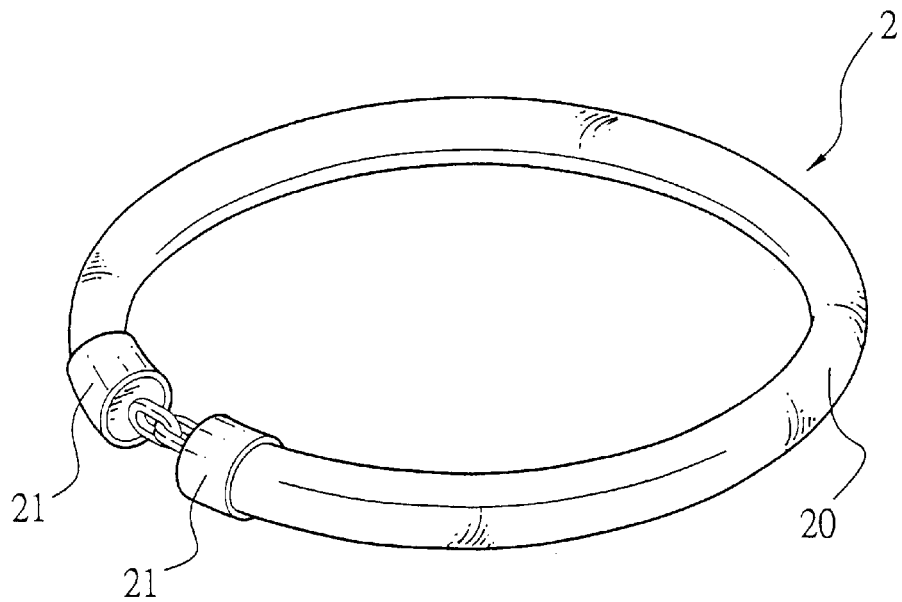
FIG. 2 illustrates another structure of bracelet constructed according to the prior art.
Figure 3:
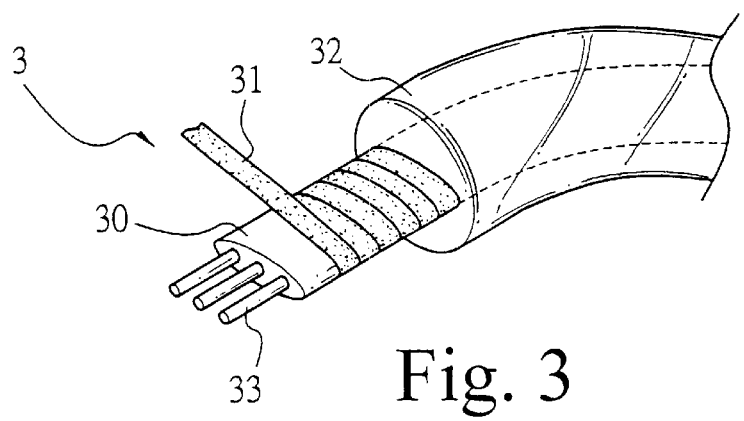
FIG. 3 is a cutaway view of a part of a color ornamental according device according to one embodiment of the present invention.
Figure 4:
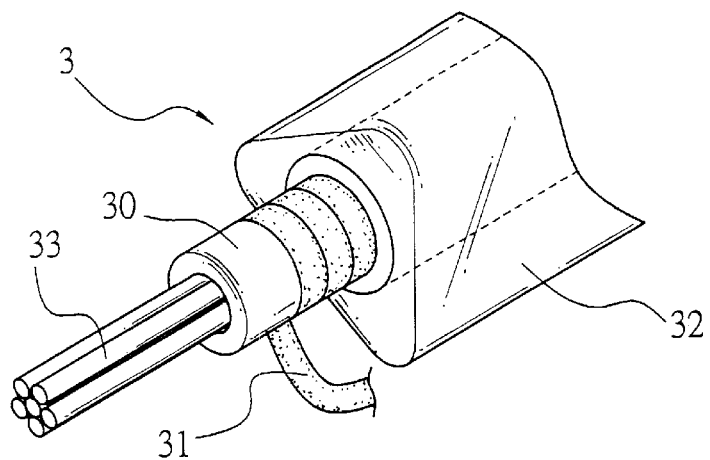
FIG. 4 is a cutaway view of a part of an alternate form of the color ornamental cord device according to the present invention.
Figure 5:
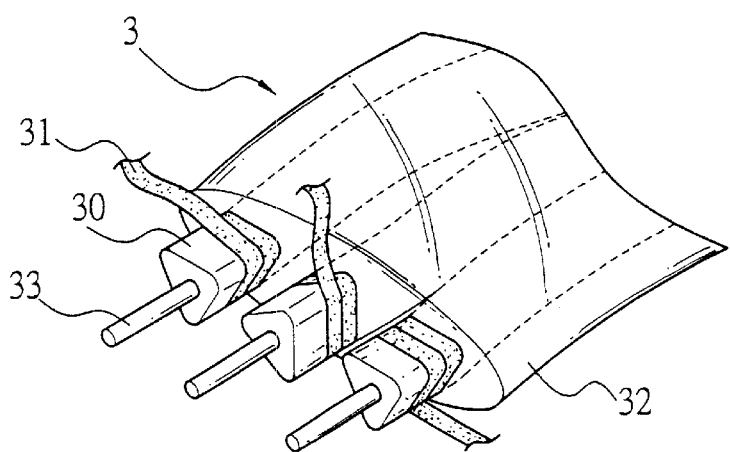
FIG. 5 is a cutaway view of a part of another alternate form of the color ornamental cord device according to the present invention.
Figure 6:
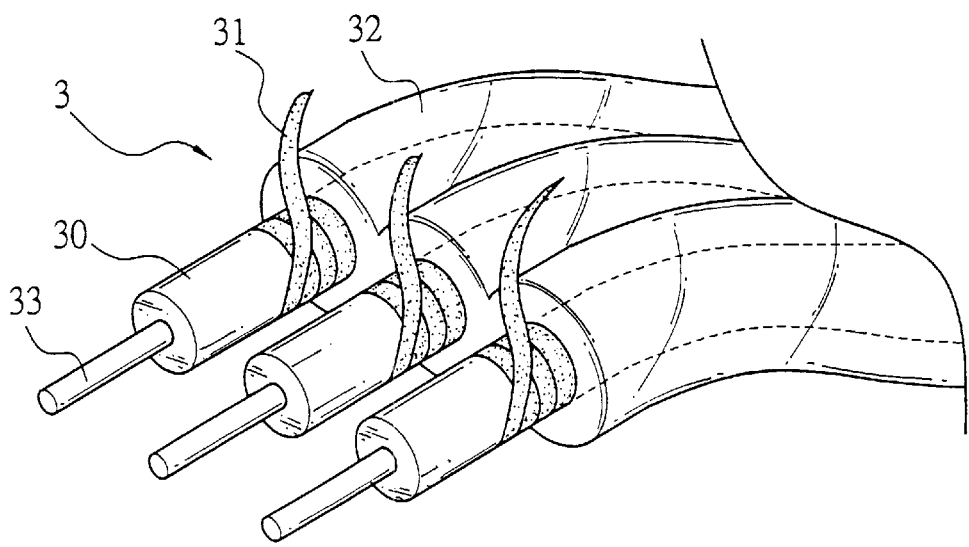
FIG. 6 is a cutaway view of a part of still another alternate form of the color ornamental cord device according to the present invention.
Figure 7:
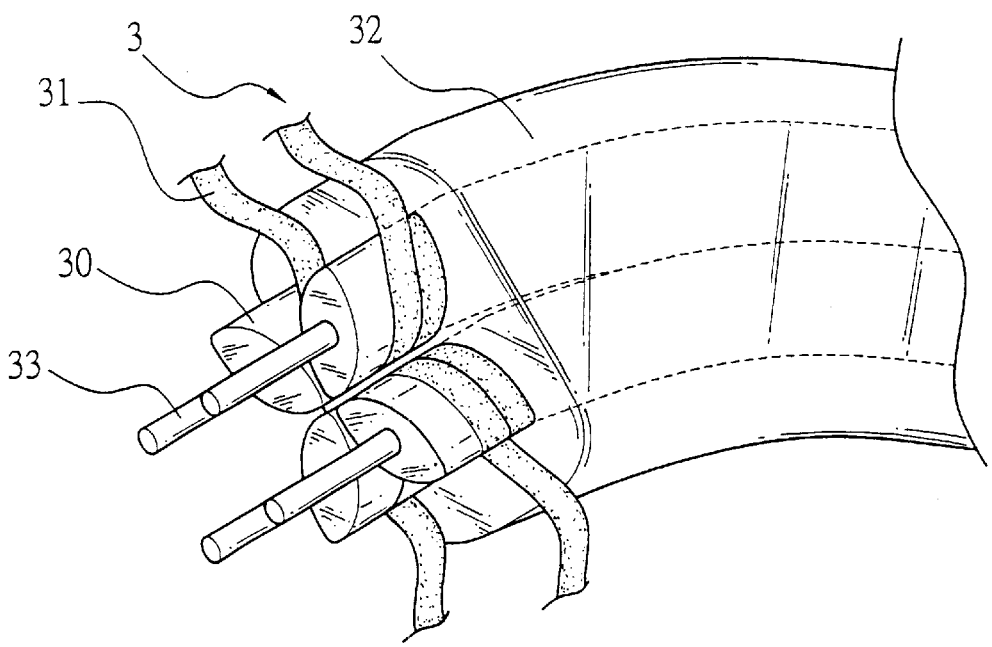
FIG. 7 is a cutaway view of a part of still another alternate form of the color ornamental cord device according to the present invention.

Referring to FIG. 3, a color ornamental cord device 3 comprises a supporting core material 30, a color ornamental material 31 surrounding the supporting core material 30, and a transparent plastic cover layer 32 extrusion-molded on the color ornamental material 31. The color ornamental material 31 can be a color tape wound round the supporting core material 30, or a meshed color tube sleeved onto the supporting core material 30. Under the illumination of light, the color design of the color ornamental material 31 is viewed through the transparent plastic cover layer 32. According to the present invention, the supporting core material 30 is extrusion-molded from plastics, having reinforcing wires 33 embedded therein. The reinforcing wires 33 can be metal wires, or wires made of fifers. In the embodiment shown in FIG. 3, the supporting core material 30 is reinforced with three metal wires 33 arranged in parallel, and the transparent plastic cover layer 32 has a circular cross section. In the embodiment shown in FIG. 4, the reinforcing wires 33 are arranged into a core embedded in the supporting core material 30, and the transparent plastic cover layer 32 has a triangular cross section.

FIGS. from 5 through 7 show three other alternate forms of the present invention. According to these alternate forms, the color ornamental cord device 3 comprises multiple pieces of supporting core material 30 arranged in parallel, each piece of supporting core material 30 having a reinforcing wire 33 embedded therein, color ornamental material 31 respectively surrounding each piece of supporting core material 30, and a transparent plastic cover layer 32 extrusion-molded on the color ornamental material 31 to hold the multiple pieces of supporting core material 30 on the inside. The multiple pieces of supporting core material 30 may have any of a variety of cross sections, and the transparent plastic cover layer 32 may have any of a variety of profiles.

Referring to FIGS. from 3 through 5 again, the shape of the cross section of the transparent plastic cover layer 32 is preferably made different from the shape of the cross section of the supporting core material 30. Based on this design, the transparent plastic cover layer 32 has different radial wall thickness extended in different directions from the periphery of the supporting core material 30 to the periphery of the transparent plastic cover layer 32, therefore a fantastic light diffusion effect is produced when putting the color ornamental cord device 3 under the radiation of light.

Figure 8:
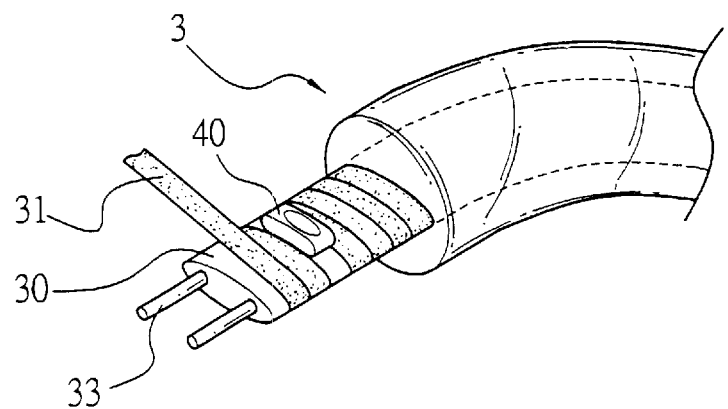
FIG. 8 is a cutaway view of a part of still another alternate form of the color ornamental cord device according to the present invention.

FIG. 8 shows still another alternate form of the present invention. According to this alternate form, the supporting core material 30 has two electrically conductive reinforcing wires 33 embedded, therein, and at least one light emitting diode 40 is respectively mounted on the color ornamental material 31 and held in the transparent plastic cover layer 32. Each light emitting diode 40 has positive and negative lead-out wires (not shown) respectively connected to the electrically conductive reinforcing wires 33. When power supply is connected to the electrically conductive reinforcing wires 33, the at least one diode 40 is respectively turned on to emit light through the transparent plastic cover layer 32.

Figure 9:
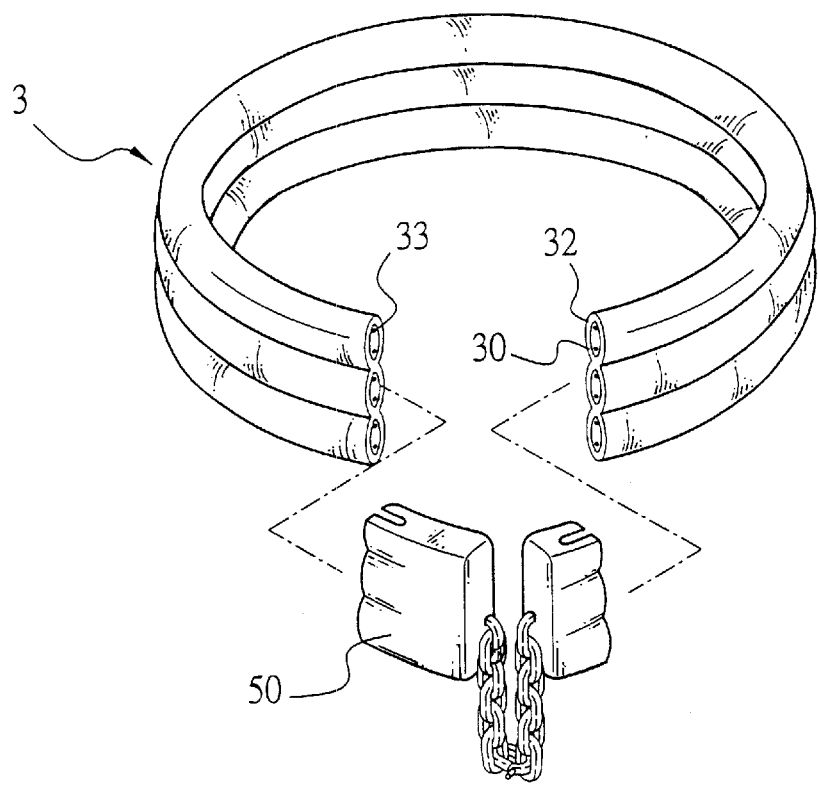
FIG. 9 shows one application example of the color ornamental cord device according to the present invention.

FIG. 9 shows still another alternate form of the present invention. According to this alternate form, a link 50 is provided and adapted to join the two distal ends of color ornamental cord device 3.

Figure 10:
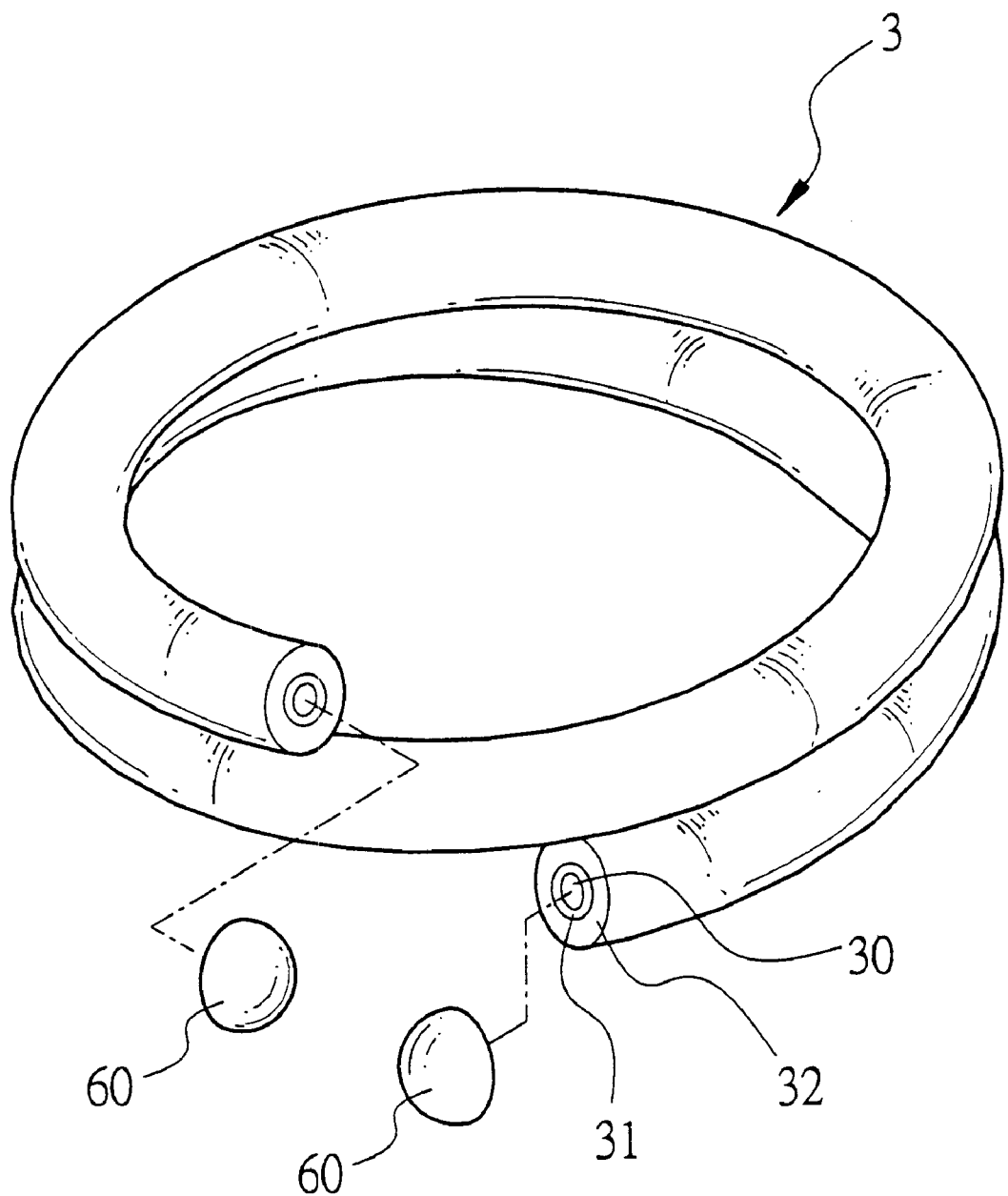
FIG. 10 shows another application example of the color ornamental cord device according to the present invention.

FIG. 10 shows still another alternate form of the present invention. According to this alternate form, the color ornamental cord device 3 is shaped like a spiral member, having two distal ends respectively mounted with an ornamental endpiece 60.

As Vindicated above, the color ornamental cord device 3 can be made having a single piece or multiple pieces of supporting core material 30 respectively reinforced with at least one reinforcing wire 33 and surrounded by a color ornamental material 31 and held in a transparent plastic cover layer 32. The color ornamental cord device 3 can be equipped with link means, and used as a bracelet.

It is to be understood that the drawings are designed for purposes of illustration only, and are not intended for use as a definition of the limits and scope of the invention disclosed.

What the invention claimed is:

1. A color ornamental cord device comprising:

at least one piece of an extrusion molded thermoplastic supporting core material;

a color ornamental tape material wound around each piece of said at least one piece of supporting core material; and a transparent plastic cover layer extrusion-molded on said color ornamental material.

2. The color ornamental cord device of claim 1 wherein said at least one piece of supporting core material each is embedded with at least one reinforcing wire.

3. The color ornamental cord device of claim 2 wherein said at least one piece of supporting core material each is embedded with at least one reinforcing metal wire.

4. The color ornamental cord device of claim 2 wherein said at least one piece of supporting core material each is embedded with at least one reinforcing fiber wire.

5. The color ornamental cord device of claim 1 further comprising at least one pair of electrically conductive reinforcing wires respectively embedded in each of said at least one piece of supporting cord material and arranged in parallel for connection to electric power supply means, and at least one light emitting diode respectively mounted on said color ornamental material and electrically connected to the electrically conductive reinforcing wire in said at least one piece of supporting cord material and held in said transparent plastic cover layer.

6. The color ornamental cord device of claim 1 further comprising link means connected between two distal ends thereof.

\* \* \* \* \*